United States Patent [19]

Breyer et al.

[11] Patent Number: 5,684,118
[45] Date of Patent: Nov. 4, 1997

[54] METHOD OF SCAVENGING FORMALDEHYDE USING A LOW MOLE RATIO MELAMINE-UREA-FORMALDEHYDE RESIN

[75] Inventors: Robert A. Breyer, Tucker; Bill R. Arndell, Stone Mountain; Semyon Stompel, Atlanta, all of Ga.

[73] Assignee: Georgia-Pacific Resins, Inc., Atlanta, Ga.

[21] Appl. No.: 624,307

[22] Filed: Mar. 26, 1996

[51] Int. Cl.⁶ .................................................... C08G 12/34
[52] U.S. Cl. .................... 528/256; 528/254; 528/261; 528/262; 524/593; 524/597; 524/843; 156/307.3; 156/331.3
[58] Field of Search ............................. 528/254, 256, 528/261, 262; 524/593, 597, 843; 156/307.3, 331.3

[56] References Cited

U.S. PATENT DOCUMENTS

| | | |
|---|---|---|
| 2,315,400 | 3/1943 | D'Alelio . |
| 4,267,277 | 5/1981 | Korf . |
| 4,285,848 | 8/1981 | Hickson . |
| 4,376,807 | 3/1983 | Cannon et al. . |
| 4,478,891 | 10/1984 | Westling . |
| 4,501,628 | 2/1985 | McGuire et al. . |
| 4,536,245 | 8/1985 | Shiau et al. . |
| 4,603,191 | 7/1986 | Kong . |
| 4,785,073 | 11/1988 | Farkas et al. . |
| 4,814,422 | 3/1989 | Diem et al. . |
| 4,997,905 | 3/1991 | Druet et al. . |
| 5,008,365 | 4/1991 | Druet et al. . |
| 5,162,462 | 11/1992 | Barthomieux et al. . |

OTHER PUBLICATIONS

Myers, G.E., "How Mole Ratio of UF Resin Affects Formaldehyde Emission and Other Properties: A Literature Critique," *Forest Products Journal*, vol. 34, No. 5, pp. 35–41, May 1984.

*Primary Examiner*—James J. Seidleck
*Assistant Examiner*—Duc Truong
*Attorney, Agent, or Firm*—Banner & Witcoff, Ltd.

[57] ABSTRACT

A method of scavenging formaldehyde in formaldehyde-based resins using a low mole ratio melamine-urea-formaldehyde resin composition. In addition, a formaldehyde-based resin containing a storage-stable low mole ratio melamine-urea-formaldehyde resin composition as a formaldehyde scavenger.

21 Claims, No Drawings

METHOD OF SCAVENGING FORMALDEHYDE USING A LOW MOLE RATIO MELAMINE-UREA-FORMALDEHYDE RESIN

BACKGROUND OF THE INVENTION

1. Field of the Invention

This invention relates to a method of scavenging formaldehyde in formaldehyde-based resins using a low mole ratio melamine-urea-formaldehyde resin composition. In addition, the invention relates to a formaldehyde-based resin containing a storage-stable low mole ratio melamine-urea-formaldehyde resin composition as a formaldehyde scavenger.

2. Description of Related Art

Typically, when a formaldehyde-based resin is used as a binder, e.g. for manufactured boards and insulation products, the binder releases a significant mount of formaldehyde into the environment during cure. Formaldehyde also can be released subsequently from the cured resin, particularly when the cured resin is exposed to acidic environments. Such formaldehyde release is undesirable, particularly in enclosed environments. In such environments, formaldehyde is inhaled by workers and comes into contact with the eyes, the mouth, and other parts of the body. Formaldehyde is malodorous and is thought to contribute to human and animal illness. It is, therefore, desirable to reduce the release of formaldehyde into the environment.

Various techniques have been used to reduce formaldehyde emission from formaldehyde-based resins. In particular, various formaldehyde scavengers have been used in an attempt to reduce formaldehyde emission. Use of a formaldehyde scavenger often is undesirable, however, not only because of the additional cost, but also because it affects the characteristics, or properties, of the cured resin. For example, using ammonia as a formaldehyde scavenger often reduces the resistance of the cured resin to hydrolysis (degradation). Further, when used in open plant processing areas, there is considerable worker exposure to vaporous ammonia, with a consequently unpleasant odor and irritation, as well as environmental control problems.

It is also well known that formaldehyde emissions can, in part, be controlled by the addition of free urea to the uncured resin system. Urea is often selected because it is inexpensive compared to other formaldehyde scavengers. Urea also acts as a formaldehyde scavenger both at and subsequent to the manufacture of the product. The urea is typically added directly to the formaldehyde-based resin. This later addition of urea to reduce free formaldehyde concentration in the resin generally yields a resin that must be cured at a relatively low temperature to avoid smoking. Unfortunately, physical properties of the resultant product are severely affected when enough urea is added to gain significant reduction of formaldehyde emission. For example, decreased resin stability, reduction of cure speed, and reduction of "tack" of the mat may be affected.

Another approach at formaldehyde scavenging involves the addition of straight melamine as a powder to formaldehyde-based resin glue mixes used for example in the manufacture of boards. However, the cost of adding melamine directly is high, particularly when compared to urea, and the advantages few. For instance, formaldehyde emissions are not substantially reduced but, instead, desirable physical properties of the boards are reduced.

SUMMARY OF THE INVENTION

The present invention is directed to a method of scavenging formaldehyde in connection with the use of a formaldehyde-based resin using a low mole ratio storage-stable melamine-urea-formaldehyde ("MUF") resin as the formaldehyde scavenger. In addition, the invention is directed to a formaldehyde-based resin containing a storage-stable, low mole ratio melamine-urea-formaldehyde resin composition as a formaldehyde scavenger.

The formaldehyde scavenger lowers formaldehyde emissions when the formaldehyde-based resin is used as a binder in manufacturing such products as boards and thermal insulation. The formaldehyde scavenger of the present invention is able to reduce the level of formaldehyde emissions while minimizing the loss of cure speed and the loss of physical properties, such as internal bond (IB), modulus of rupture (MOR), and modulus of elasticity (MOE), and while increasing the "tack" of the adhesive. In some cases, depending on the usage rates and the manufacturing process, the formaldehyde scavenger will enhance some physical properties of the formaldehyde-based resin and the resulting products, such as enhanced face strength, face appearance, and mat handling.

As used herein, low mole ratio melamine-urea-formaldehyde means a formaldehyde to urea and melamine mole ratio of less than about 1.1 and preferably between about 0.5 and 1.1.

The MUF resin formaldehyde scavenger of the present invention is prepared by:

(a) reacting an aqueous mixture of formaldehyde and urea at an F/U mole ratio of about 1.9 to 2.6 under an alkaline condition;

(b) thereafter adding a sufficient amount of a mild acid to reduce the pH of said mixture to about 5.0 to 5.7 and further reacting the mixture;

(c) neutralizing the mixture to a pH of between about 6.5 and 6.9;

(d) adding additional formaldehyde to said mixture and then adding melamine in an amount of about 2 to 10 wt % based on the total mixture weight, to achieve a cumulative F/(U+M) mole ratio of about 1.9 to 2.6 and continuing the reaction at a pH of about 6.2 to 6.9;

(e) adding additional melamine to said mixture to achieve a cumulative F/(U+M) mole ratio of about 1.7 to 2.4;

(f) adjusting the pH to about 7.6 to 8.0; and (g) then adding sufficient urea to produce a final mole ratio of F/(U +M) of about 0.5 to 1.1.

It is to be understood that both the foregoing general description and the following detailed description are exemplary and explanatory only and are not restrictive of the present invention as claimed.

DETAILED DESCRIPTION OF THE INVENTION

The invention is based on the discovery that a storage-stable, low mole ratio MUF resin produced in accordance with the present invention is an effective formaldehyde scavenger when used as an additive to formaldehyde-based resin binder compositions. In accordance with the present invention, a formaldehyde scavenging amount of the MUF resin is added to a formaldehyde-based resin before the formaldehyde-based resin is cured. Such amounts of the MUF resin can be up to about 50 wt % of the total weight of the solids content of the final resin composition, although typically up to about 20 wt % is used. Preferably, the final resin will contain up to about 10 wt % of the MUF resin solids.

Any formaldehyde-based resin prone to undesired formaldehyde emissions is contemplated for use with the formaldehyde scavenger of the present invention. Such resins are well known in the art for use as adhesives or binders for composite board products such as particle boards, fiber boards, panels, plywood, and the like, for thermal insulation products and for other glass fiber mat applications. Examples of formaldehyde-based resins that can profit from the use of the formaldehyde scavenger of this invention include urea-formaldehyde resins, phenol-formaldehyde resins, melamine-formaldehyde resins, melamine-modified urea-formaldehyde resins, melamine-modified phenol-formaldehyde resins, and the like. Generally, the formaldehyde scavenger of the present invention will be used with urea-formaldehyde resins.

Further, the formaldehyde scavenger of the present invention may be used in place of or in combination with prior art scavengers. For example, the formaldehyde scavenger of the present invention may be used to replace urea as a scavenger in its entirety, or may be used to reduce the amount of urea used as a scavenger in urea-formaldehyde resins. The consideration to use the formaldehyde scavenger of the present invention as the sole scavenger depends on the desired properties of the final product and cost. For example, addition of the formaldehyde scavenger MUF resin of the present invention to a conventional formaldehyde-based resin used in the manufacture of composite boards also provides an increase in the tack of the conventional resin.

As discussed above, any formaldehyde-based resin may be treated with the scavenger of the present invention although generally the resin will be a urea-formaldehyde resin. Typical urea-formaldehyde resins which can benefit from the present invention have a molar ratio of formaldehyde to urea (F/U) of within the range of about 0.5 to 2, typically about 1.4 to 1.6. It is desirable to decrease the F/U ratio in the UF resin to reduce the amount of formaldehyde in the resin. However, the ratio can only be reduced so far before the desired performance characteristics of the resin are affected. For example, internal bond strength of the resin is reduced at low F/U mole ratios, particularly at ratios below about 1.1. Other problems include increased glue consumption, deteriorated cold tack, deteriorated strength, and increased swelling.

The MUF resin formaldehyde scavenger of the present invention is prepared by a specific program of reacting formaldehyde with urea and then with melamine under controlled mole ratios and reaction conditions. According to the invention, the melamine- urea-formaldehyde resin is prepared according to the following steps:

(a) An aqueous mixture of formaldehyde and urea is reacted at an F/U mole ratio of about 1.9 to 2.6, preferably about 2.1, under an alkaline condition.

(b) Thereafter, a sufficient amount of a mild acid is added to reduce the pH of the mixture to about 5.0 to 5.7, preferably about :5.4 to 5.6, and the mixture is reacted further.

(c) The mixture then is neutralized to a pH between about 6.5 and 6.9.

(d) Thereafter, additional formaldehyde is added to the mixture and then melamine in an amount of about 2 to 10 wt %, preferably about 2 to 6 wt %, based on the total mixture weight, is added to the mixture, to achieve a cumulative F/(U+M) mole ratio of about 1.9 to 2.6, preferably about 2.1 to 2.5, and, most preferably about 2.4, and the reaction is continued at a pH about 6.2 to 6.9, preferably about 6.5 to 6.9.

(e) Additional melamine is added to the mixture to achieve a cumulative F/(U+M) mole ratio of about 1.7 to 2.4.

(f) The pH of the mixture is adjusted to about 7.6 to 8.0.

(g) Sufficient urea is added to produce a final mole ratio of F/(U+M) of about 0.5 to 1.1, preferably about 0.:5 to 0.8, and, most preferably, about 0.65. The free formaldehyde level of the resulting MUF resin is less than 0.1%.

The melamine and urea mole ratio is calculated based on the number of active nitrogen sites in each compound.

The amount of time sufficient for the reaction to proceed to the desired extent at each step varies, depending on the particular reaction conditions including pH and temperature. Based on this disclosure, it is within the skill of the art to vary the conditions to obtain a particular result. Generally, the initial reaction of step (a) is continued until a Gardner viscosity of about G is reached. After the additional formaldehyde and melamine are added in step (d), the reaction proceeds until a Gardner viscosity of about L is reached. After the melamine is added in step (e), the reaction proceeds until a Gardner viscosity of about T is reached. The temperature is generally maintained between about 70° and 100° C. during each step of the reaction in order to advance the resin.

An alkaline condition may be established and maintained in step (a) by adding an alkaline agent which promotes the desired reaction and provides the proper pH conditions. Typical agents include, but are not limited to triethanolamine, alkali metal hydroxides such as sodium, lithium or potassium hydroxide, preferably sodium hydroxide, or other alkaline compounds such as alkali metal carbonates, alkaline earth hydroxides, organic amines. Preferably, triethanolamine is used to establish the initial alkaline condition and sodium hydroxide is added to maintain the alkalinity, as needed. In accordance with the present invention, an alkaline condition is a pH above 6.7 and preferably is between about 7 and 7.9.

Following this first step, a sufficient mount of a mild acid is added to adjust the pH to an acidic value that permits good control of the rate of condensation with a preferred pH being about 5.0 to 6.5, preferably about 5.4 to 5.6. Mild acids include dilute mineral acids, organic acids or acid salts, such as ammonium chloride, ammonium sulfate, etc., or alum that are diluted to a controlled concentration. Usually about 15 to 25 wt % solution of the acid in water. Preferred mild acids include about 20 wt % solutions of either formic acid or ammonium sulfate. The mount of mild acid required to adjust the pH depends on various conditions within the reaction mixture and the particular mild acid used, and can easily be determined.

The acidic reaction medium may be neutralized with any appropriate alkaline neutralizing agent known in the art, such as an alkali metal hydroxide, alkali metal carbonates, alkaline earth hydroxides, or organic mines, as described above. Preferably, the mixture is neutralized with triethanolamine or sodium hydroxide.

The pH of the reaction mixture in steps (e) and (d) may also be established by adding an alkaline agent as described above. Preferably, sodium hydroxide is used to maintain the pH at this step.

The alkaline pH of the reaction mixture in step (f) is preferably established using a suitable mount of triethanolamine, although any other alkaline agent may be used to adjust the alkalinity of the reaction mixture such as those used in (a).

Skilled practitioners recognize that the reactants are commercially available in many forms. Any form which can react with the other reactants and which does not introduce extraneous moieties deleterious to the desired reaction and reaction product can also be used in the preparation of the melamine-urea-formaldehyde resin of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another monomer, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. Nos. 5,362,842 and 5,389,716.

Although melamine is specifically mentioned, in the practice of this invention, the melamine may be totally or partially replaced with other aminotriazine compounds. Other suitable aminotriazine compounds include substituted melamines, or cycloaliphatic guanamines, or mixtures thereof. Substituted melamines include the alkyl melamines and aryl melamines which can be mono-, di-, or tri-substituted. In the alkyl substituted melamines, each alkyl group can contain 1-6 carbon atoms and, preferably 1-4 carbon atoms. Typical examples of some of the alkyl-substituted melamines are monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, 1 phenyl radical. Typical examples of an aryl-substituted melamine are monophenyl melamine and diphenyl melamine.

Any of the cycloaliphatic guanamines can be employed in the practice of this invention. Preferably, the cycloaliphatic guanamines should not have more than 15 carbon atoms. Typical examples of some of the cycloaliphatic guanamines are tetrahydrobenzoguanamine, hexahydrobenzoguanamine, 3-methyl-tetrahydrobenzoguanamine, 3-methyl-hexahydrobenzoguanamine, 3,4-dimethyl- 1,2,5,6-tetrahydrobenzoguanamine, and 3,4-dimethylhexahydrobenzoguanamine and mixtures thereof. A preferred cycloaliphatic guanamine is tetrahydrobenzoguanamine. Mixtures of aminotriazine compounds include melamine and an alkyl-substituted melamine, such as dimethyl melamine, or melamine and a cycloaliphatic guanamine, such as tetrahydrobenzoguanamine.

The reactants may also include a small amount of a resin modifier such as ethylenediamine (EDA). Additional modifiers, such as ethylene ureas, and primary, secondary and tertiary amines, for example, dicyanodiamide can also be incorporated into the resin of the invention. Concentrations of these modifiers in the reaction mixture may vary from 0.05 to 5.00%. These types of modifiers may promote hydrolysis resistance, polymer flexibility and lower formaldehyde emissions. Ammonia may also be added as within the skill of the art.

Prior to use, the formaldehyde-based resin and the low mole ratio MUF resin are blended. Manufacturing board products produced with the formaldehyde-based resin containing the low mole ratio MUF resin formaldehyde scavenger of the present invention may be composite boards, such as particle boards, chip boards, flake board, fiber board, plywood, or panels. The resin may be applied to plywood or panel boards in any manner within the skill of the art. The resin may also be mixed with furnish to produce particle boards and the like. The boards are then cured, generally with a combination of heat and pressure.

The following examples are for purposes of illustration and are not intended to limit the scope of the claimed invention.

EXAMPLES

Example 1

Preparation of the low mole ratio MUF resin

50% formaldehyde solution (about 26 parts by weight (pbw)) is loaded into a reactor. The pH is adjusted with 85% triethanolamine (about 0.05 pbw) to pH 7.2–7.8. Urea (about 12 pbw) is then added into the reactor, and the reaction mixture is heated to 95° C. and then held at 95° C. for 20 minutes. During this time, 25% caustic is added as needed to maintain the pH above 6.7. The pH is then adjusted to about 5.4 to 5.6 with 20% ammonium sulfate, and the resin is then held at 95° C. to a Gardner viscosity of G. The reaction mixture is then neutralized slightly on the acid side with 85% triethanolamine (0.03 wt %) while cooling to 80° C. 50% formaldehyde solution (about 10 pbw) is added, and the pH adjusted as needed with 25% sodium hydroxide to a pH of about 6.5 to 6.9. Melamine (about 5 pbw) is added, and the mixture is then reacted at 75° C. to a Gardner viscosity of L, while maintaining a neutral pH. Melamine (about 2 pbw) is added. The reaction mixture is reacted at 70°–75° C. until a Gardner viscosity target of T is reached. The pH is adjusted to 7.6–8.0 with triethanolamine while cooling to 70° C. Urea (about 39 pbw) and fresh water (about 6 pbw) are added. The reaction mixture is cooled to 50°–55° C. and held until all of the urea dissolves. If necessary, the pH is adjusted to 7.6–8.0. The mixture is then cooled to 25° C. During cooling at below 45° C., an ammoniated salt catalyst (1.00%) is added to increase the cure rate of the resin.

Example 2

Preparation of the low mole ratio MUF resin

50% formaldehyde solution (about 26 parts by weight (pbw)) is loaded into a reactor. Fresh water is added (about 0.5%). The pH is adjusted with 85% triethanolamine (about 0.03 pbw) and 50% caustic (about 0.0001 pbw) to pH 7.6. Urea (about 12 pbw) is then added into the reactor, and the reaction mixture is heated to about 95° C. and then held at 95° C. for 20 minutes. During this time, 50% caustic is added as needed to maintain the pH above 6.7. The pH is then adjusted to about 5.5 with 16% formic acid (about 0.0001 pbw) and the resin is then held at about 95° C. to a Gardner viscosity of G. The reaction mixture is then neutralized slightly on the acid side with 85% triethanolamine (0.02 wt %) while cooling to 80° C. 50% formaldehyde solution (about 10 pbw) is added, and the pH adjusted as needed with 50% caustic to a pH of about 6.8. Melamine (about 5 pbw) is added, and the mixture is then reacted at about 75° C. to a Gardner viscosity of L, while maintaining a neutral pH. Melamine (about 2 pbw) is added. The temperature is reduced to about 70° C. The reaction mixture is reacted until a Gardner viscosity target of T is reached. The pH is adjusted to about 7.8 with 85% triethanolamine (0.02 pbw) and 50% caustic (about 0.0001 pbw). Urea (about 39 pbw) and fresh water (about 5 pbw) are added. The reaction mixture is cooled to about 50° C. and held for 20 minutes. The mixture is then cooled to 25° C. During cooling, sodium sulfate (1.00 pbw) is added and mixed for at least 10 minutes. The pH is then adjusted with 50% caustic and 7.5% formic acid as needed to obtain a pH of about 7.8.

We claim:

1. A method of scavenging formaldehyde in a formaldehyde-based resin comprising adding to the formaldehyde-based resin a formaldehyde scavenging amount of a low mole ratio melamine-urea-formaldehyde resin having a formaldehyde to urea and melamine ratio of between about 0.5 and 1.1 prepared by:
   (a) reacting an aqueous mixture of formaldehyde and urea at an F/U mole ratio of about 1.9 to 2.5 under an alkaline condition;
   (b) thereafter adding a sufficient amount of a mild acid to reduce the pH of said mixture to about 5.0 to 5.7 and further reacting the mixture;
   (c) neutralizing the mixture to a pH of between about 6.5 and 6.9;
   (d) adding additional formaldehyde to said mixture, and then adding melamine in an amount of about 2 to 10 wt % based on total mixture weight, to achieve a cumulative F/(U+M) mole ratio of about 1.9 to 2.6 and continuing the reaction at a pH of about 6.2 to 6.9;
   (e) adding additional melamine to said mixture to achieve a cumulative F/(U+M) mole ratio of about 1.7 to 2.4;
   (f) adjusting the pH to about 7.6 to 8.0; and
   (g) then adding sufficient urea to produce a final F/(U+M) mole ratio of about 0.5 to 1.1.

2. The method of claim 1 wherein in (a) the F/U mole ratio is about 2.1.

3. The method of claim 1 wherein in (b) the pH is reduced to about 5.4 to 5.6.

4. The method of claim 1 wherein in (a) the pH is between about 7.0 and 7.9.

5. The method of claim 1 wherein in (d) the cumulative F/(U+M) ratio is about 2.4.

6. The method of claim 1 comprising adding up to about 20 wt % of the low mole ratio melamine-urea-formaldehyde resin to the formaldehyde-based resin.

7. The method of claim 6 comprising adding up to about 10 wt % of the low mole ratio melamine-urea-formaldehyde resin to the formaldehyde-based resin.

8. The method of claim 1 further comprising adding at least one formaldehyde scavenger in addition to the low mole ratio melamine-urea-formaldehyde resin.

9. The method of claim 1 wherein the formaldehyde-based resin is a urea-formaldehyde resin.

10. A method of reducing the emission of formaldehyde from products consolidated with a formaldehyde-based resin adhesive comprising adding to the resin prior to application to the boards an amount of a low mole ratio melamine-urea-formaldehyde resin, applying the resin to the boards, and curing the resin;
    wherein the low mole ratio melamine-urea-formaldehyde resin has a formaldehyde to urea and melamine ratio of between about 0.5 and 1.1 and is prepared by:
    (a) reacting an aqueous mixture of formaldehyde and urea at an F/U mole ratio of about 1.9 to 2.5 under an alkaline condition;
    (b) thereafter adding a sufficient amount of a mild acid to reduce the pH of said mixture to about 5.0 to 5.7 and further reacting the mixture;
    (c) neutralizing the mixture to a pH of between about 6.5 and 6.9;
    (d) adding additional formaldehyde to said mixture, and then adding melamine in an amount of about 2 to 10 wt % based on total mixture weight, to achieve a cumulative F/(U+M) mole ratio of about 1.9 to 2.6 and continuing the reaction at a pH of about 6.2 to 6.9;
    (e) adding additional melamine to said mixture to achieve a cumulative F/(U+M) mole ratio of about 1.7 to 2.4;
    (f) adjusting the pH to about 7.6 to 8.0; and
    (g) then adding sufficient urea to produce a final F/(U+M) mole ratio of about 0.5 to 1.1.

11. The method of claim 10 wherein the composite board is selected from the group consisting of particle board, fiber board, and plywood.

12. The method of claim 10 wherein the formaldehyde-based resin is a urea-formaldehyde resin.

13. A formaldehyde-based resin containing a formaldehyde scavenging amount of a low mole ratio melamine-urea-formaldehyde resin having a formaldehyde to urea and melamine ratio of between about 0.5 and 1.1 prepared by:
    (a) reacting an aqueous mixture of formaldehyde and urea at an F/U mole ratio of about 1.9 to 2.5 under an alkaline condition;
    (b) thereafter adding a sufficient amount of a mild acid to reduce the pH of said mixture to about 5.0 to 5.7 and further reacting the mixture;
    (c) neutralizing the mixture to a pH of between about 6.5 and 6.9;
    (d) adding additional formaldehyde to said mixture, and then adding melamine in an amount of about 2 to 10 wt % based on total mixture weight, to achieve a cumulative F/(U+M) mole ratio of about 1.9 to 2.6 and continuing the reaction at a pH of about 6.2 to 6.9;
    (e) adding additional melamine to said mixture to achieve a cumulative F/(U+M) mole ratio of about 1.7 to 2.4;
    (f) adjusting the pH to about 7.6 to 8.0; and
    (g) then adding sufficient urea to produce a final F/(U+M) mole ratio of about 0.5 to 1.1.

14. The formaldehyde-based resin of claim 13 wherein in (a) the F/U mole ratio is about 2.1.

15. The formaldehyde-based resin of claim 13 wherein in (b) the pH is reduced to about 5.4 to 5.6.

16. The formaldehyde-based resin of claim 13 wherein in (a) the pH is between about 7.0 and 7.9.

17. The formaldehyde-based resin of claim 13 wherein in (d) the cumulative F/(U+M) ratio is about 2.4.

18. The formaldehyde-based resin of claim 13 wherein the formaldehyde-based resin contains up to about 20 wt % of the low mole ratio melamine-urea-formaldehyde resin.

19. The formaldehyde-based resin of claim 18 wherein the formaldehyde-based resin contains up to about 10 wt % of the low mole ratio melamine-urea-formaldehyde resin.

20. The formaldehyde-based resin of claim 13 further comprising at least one formaldehyde scavenger in addition to the low mole ratio melamine-urea-formaldehyde resin.

21. The formaldehyde-based resin of claim 13 wherein the formaldehyde-based resin is a urea-formaldehyde resin.

* * * * *